March 9, 1965    E. STEINMAN    3,172,423
HYDRAULIC FLOW CONTROL DEVICE
Filed May 25, 1961

INVENTOR
ELIAHU STEINMAN

BY Blum, Moscovitz,
Friedman and Blum

ATTORNEYS.

3,172,423
HYDRAULIC FLOW CONTROL DEVICE
Eliahu Steinman, 7 Yavne St., Tel Aviv, Israel
Filed May 25, 1961, Ser. No. 126,745
4 Claims. (Cl. 137—493)

This invention relates to a hydraulic flow control device of the kind which is designed to be employed in the control of the flow of hydraulic fluid from a pressurized source to a location where the hydraulic pressure is to be used to operate, for example, a hydraulic brake system of a motor vehicle.

In the use of pressurized hydraulic fluid for such operation, the danger arises that, should one component part of the system develop a leak, continued actuation of the brake mechanism will result in the eventual loss of the hydraulic fluid and the failure to operate of the entire system.

It is an object of the present invention to provide a hydraulic flow control which obviates the above dangers.

According to the present invention there is provided a hydraulic flow control device comprising a device inlet and a pressure chamber separated from the inlet by a pressure responsive member and provided with a device outlet, a control valve designed to control communication between the inlet and the pressure chamber and being so designed as to be biased into a closed position by the direct action of fluid flowing through the device inlet, a valve displacing means associated with the pressure zone and arranged to be displaced so as to open the valve upon a rise of fluid pressure in the pressure chamber due to the displacement of the pressure responsive member under the influence of the fluid.

Preferably, part of the walls of the pressure chamber is constituted by a resilient member adapted to be displaced under the influence of hydraulic pressure, the valve displacing means being secured to or formed integrally with or coupled to the resilient member.

In a preferred embodiment the valve displacing means is coupled to the resilient member by means of a friction clutch, the arrangement being such that a minimal displacement of the valve displacing means results in an opening or closing of the valve. With such an arrangement the valve can be opened as soon as the pressure in the pressure chamber overcomes the resilience of the resilient member whilst the valve can be closed as soon as the pressure in the chamber drops by even a minimal amount and not necessarily to a predetermined low level.

Figure 1:
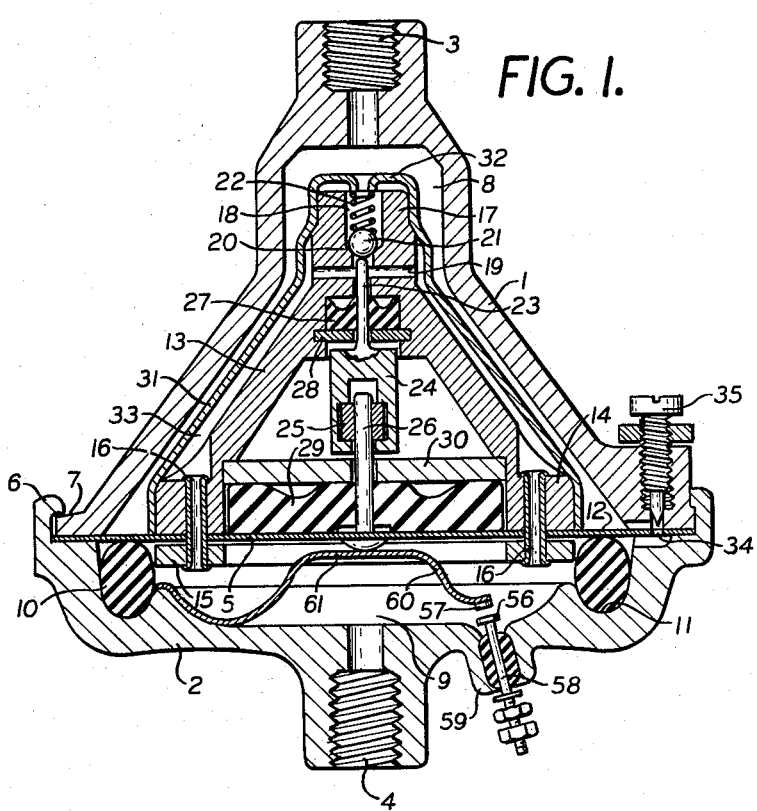
Figure 2:
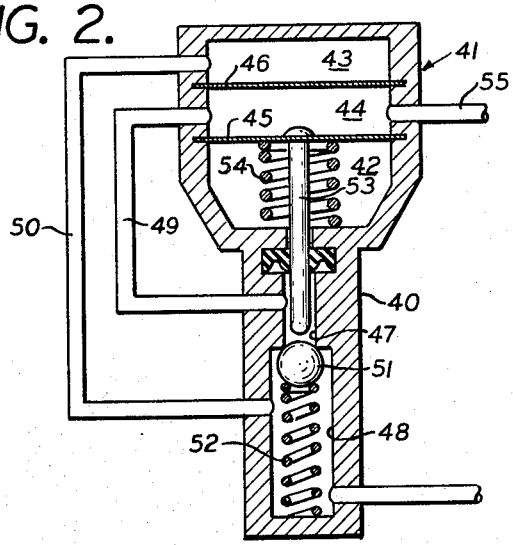

For a better understanding of the present invention and to show how the same may be carried out in practice, reference will be made to the accompanying drawings in which:

FIG. 1 is a cross-sectional view of a hydraulic flow control device in accordance with the present invention; and FIG. 2 is a schematic representation of a further form of control device in accordance with the invention.

In FIG. 1 there is shown a control device which comprises an outer casing, formed of an upper conical shell 1, and a base shell 2 secured thereto. The upper conical shell 1 has a duct 3 constituting a device inlet formed at its apex which duct is internally threaded and can be connected to a source of hydraulic fluid. The base shell 2 is similarly provided with a centrally disposed duct 4 constituting a device outlet which is also internally threaded and which can be connected to an outlet pipe through which the hydraulic fluid can flow. A circular non-metallic resilient diaphragm 5 is clamped at its rim between the upper conical shell 1 and the base shell 2 while the rim 6 of the base shell 2 is bent inwardly and pressed on to an outwardly directed flange 7 at the base of the upper conical shell 1. In this way the two portions of the casing are firmly secured to one another and also secure in position the diaphragm 5. The diaphragm 5 effectively divides the interior of the casing into an upper and a lower region 8 and 9, the lower region 9 constituting a pressure chamber. An O-ring 10 formed of rubber or the like is located in an annular groove 11 formed in the base shell 2 and supports an annular portion 12 of the diaphragm 5 directly adjacent the clamped rim thereof.

An inner conical member 13 is provided at its base with an outwardly directed flange 14 which flange 14 rests on the diaphragm 5 and clamps it to a ring 15 by means of hollow rivets 16 which pass through corresponding apertures in the ring 15, diaphragm 5 and flange 15. The head 17 of the inner conical member 13 is provided with a vertically disposed duct 18 which communicates at its lower end with a plurality of radially disposed transverse ducts 19. The wall of the vertically disposed duct 18 is provided with a shoulder 20 which forms a seat for the ball 21 of a ball control valve on to which shoulder 20 the ball 21 is biased by means of a compression spring 22. A centrally disposed rod 23 passes through an aperture formed in the head 17 of the inner conical member 13 and engages at one end the ball 21 and at the other end is formed integrally with a hollow cylindrical member 24 in the inner wall of which is set a friction clutch 25 in the form of a split cylinder. Slidable within this friction clutch 25 and in the cylindrical space defined by the hollow cylinder 24 is one end of a central rod 26 the other end of which is clamped to the center of the diaphragm 5. Surrounding the central rod 23 is a rubber sealing grommet 27 which rests on a disc 28 secured to the inner wall of the inner conical member 13 which disc 28 defines the upper limit of movement of the hollow cylindrical member 24 with respect to the inner conical member 13.

The central portion of the diaphragm 5 is biased downwardly by means of compressed resilient material 29 such as, for example, synthetic rubber which is enclosed between this portion of the diaphragm and a centrally apertured plate 30 secured to and within the inner conical member 13. The central rod 26 clamped to the diaphragm passes through the central aperture formed in this plate 30.

A conical shell 31 surrounds the inner conical member 13 and is secured thereto in a fluid-tight fashion at the outer edge of the outwardly directed flange 14 of the inner member 13 and at the outer wall of the head 17 of the member 13. The upper end 32 of this shell 31 extends above the head 17 of the inner conical member 13 and is centrally apertured, the compression spring 22 bearing at its upper end against the rim of this end 32 of the shell 31. The conical walls of the shell 31 are spaced from the adjacent walls of the inner conical member 13 and define with these walls a channel 33 which communicates at one end with the transverse ducts 19 in the head 17 of the inner conical member 13 and at the other end via the hollow rivets 16 with the lower region 9 of the casing.

Independent control of communication between the upper and lower regions 8 and 9 of the casing via an aperture 34 formed near the edge of the diaphragm 5 is provided by means of a conically pointed valve screw 35 which, when screwed firmly on to its seating, interrupts communication between the two regions 8 and 9 but which, when screwed off its seating, allows this communication to take place.

The operation of the control valve in controlling the flow of hydraulic fluid to a hydraulic brake system and in interrupting the flow of such a fluid when that brake system develops a fault due to a leak will now be described. Upon the operation of the brake actuating mechanism, oil under pressure is introduced through the duct 3 and flows through the channel formed between the upper conical shell 1 and shell 31. The effect of this flow of oil under pressure is to press the annular portion 12 of the diaphragm 5 against the O-ring 10, to force the ball 21 firmly against its seat 20, and, by acting on the outer surface of the shell 31, to cause the latter together with the inner conical member 13 to be displaced downwardly, the shell 31 and member 13 together constituting a pressure responsive member. As long however as the ball 21 remains pressed against its seating 20 no oil can flow from the upper region 8 of the casing to the lower region 9 and thence out to the brake system. With the lowering of the inner conical member 13 and the central portion of the diaphragm 5, the volume of the lower region 9 contracts and oil is forced out of the region 9 under pressure to operate the brake system. Assuming that this system is in correct working order and no leak of oil occurs therefrom the pressure of oil in the lower region 9 due to the contraction of its volume increases thereby causing the central portion of the diaphragm 5 to be displaced upwardly against the biasing effect of the resilient material 29 acting thereon. The upward displacement of the central portion of the diaphragm 5 is accompanied by an equivalent upward displacement of the rod 26 secured thereto and of the hollow cylindrical member 24 and upwardly projecting rod 23. This displacement of the hollow cylindrical member 24 can continue until this member 24 abuts the lower surface of the disc 28. Consequent upon the upward displacement of the hollow cylindrical member 24 and its associated rod 23, the ball 21 is displaced from its seat 20 and oil can flow through the vertical and transverse ducts 18 and 19 into the channel 33 and via the hollow rivets 16 and lower region 9 through the duct 4 to the brake mechanism. The pressure in the lower region 9 of the casing can continue to build up after the opening of the ball valve and with this increasing oil pressure the diaphragm 5 is increasingly displaced upwards as is the rod 26 within the hollow cylindrical member 24. However in view of the fact that the hollow cylindrical member bears against the rigidly secured disc, this movement of the rod 26 is relative to the member 24. Upon the normal flow of oil to the brake mechanism the inner conical member 13 remains downwardly depressed while the ball valve remains open.

If however a leak develops in the oil supply conduit in communication with the duct 4 the pressure in the lower region 9 drops and the instant this drop takes place the upwardly displaced central portion of the diaphragm 5 moves downwards under the biasing influence of the resilient medium 29 and this downward displacement of the diaphragm 5 is imparted to the centrally secured rod 26 and the hollow cylindrical member 24 frictionally gripping it. As a result of the displacement of the hollow cylindrical member 24 the upwardly projecting rod 23 is also downwardly displaced and the ball 21 is pressed by means of the compression spring 22 against its seat 20 and the control valve interrupts the supply of oil to the brake mechanism. In this way the continued leakage of oil is prevented.

Upon the de-actuation of the brake mechanism during normal operation of the device, oil will flow under pressure via the duct 4 and the lower region 9 and through the hollow rivets 16, channel 33, transverse ducts 19 and the open ball valve out of the control device via the duct 3. The ball valve is, of course, maintained open during this counterflow due to the action of the pressurized oil on it and also due to the upward displacement of the diaphragm 5 as a result of the increased pressure in the lower region 9.

When, for example, upon installation of a control device as just described or after repair of a leak in the brake mechanism to which it is attached, it is desired to fill the device with oil, the valve screw 35 is turned so as to open this valve, oil is introduced through the duct 3 and flows into the upper region 8 and, via the aperture in the diaphragm, through the lower region 9 and the duct 4 to the brake mechanism expelling on the way any air which may have entered the system. When the brake mechanism is full of oil, oil will flow through the hollow rivets 16 and the channel 19 into the transverse and vertical ducts thus entirely filling the control device with oil.

It is possible to associate a separate control device of the kind described with the brake system associated with each wheel of the motor vehicle or alternatively with the brake system associated with each pair of wheels of the vehicle. Thus, should a fault develop in connection with the brake system associated with a particular wheel or a pair of wheels, the provision of a control device in accordance with the invention prevents the continued leakage of the oil with consequent disastrous results upon the operation of the remaining brake system of the vehicle. It is also possible to associate each control device with a signalling mechanism which can give a warning to the driver that one or more of his brake systems has (have) failed. This signal mechanism can, for example, come into operation when, upon operation of the brake actuating mechanism by a driver, the ball valve remains closed or closes. Thus, for example, an electric contact can be interposed in the lower region 9 and this is contacted by the diaphragm 5 only when the latter has not been upwardly displaced to open the ball valve. Upon such contact being made, an electric circuit is made and a signalling device is actuated. Such a contact is shown in FIG. 1 as comprising two poles 56, 57. Pole 56 is mounted on the inner end of a conductor rod 58 positioned in a bushing 59 whereas pole 57 is mounted on the tip of a bent springy conductor 60 whose bulging section 61 bears on diaphragm 5. Conductor 60 is clamped between O-ring 10 and shell 2 and is thus connected to the latter in a current conducting manner. Shell 2 and pole 58 form part of an electric circuit which comprises a signalling device. When diaphragm 5 is lowered poles 56, 57 touch whereby the circuit is closed and the signalling device put into operation.

In FIG. 2 there is shown schematically a second form of control device in accordance with the present invention wherein a casing 40 encloses a valve chamber 41 which is divided into upper, lower and intermediate regions 42, 43 and 44, by means of parallelly disposed metallic diaphragms 45 and 46, the intermediate region constituting a pressure chamber whilst the diaphragm 46 constitutes a pressure responsive member. The diaphragms 45 and 46 are suitably clamped in position at their rim portions with respect to the walls of the chamber 41. The upper region 42 communicates via a relatively narrow vertical duct 47 and a wide vertical duct 48 with a source of fluid not shown. The narrow vertical duct 47 communicates via a duct 49 with the intermediate region 44 while the relatively wide vertical duct 48 communicates via duct 50 with the lower region 43.

A ball 51 is biased by means of a compression spring 52 on to a seat constituted by the upper ring of the narrow vertical duct 47, the ball and its seat constituting a control valve.

An upwardly extending rod 53 is secured at one end to a central position of the diaphragm 45 and extends into the narrow vertical duct 47 to a position adjacent the ball 51. A compression spring 54 surrounds the upwardly extending rod 53 and serves to bias the diaphragm 45 downwardly. The intermediate region 44 is provided with an outlet duct 55 through which hydraulic fluid under pressure can be fed to a brake mechanism (not shown).

In operation and when the entire system is full with oil, when the driver of a vehicle operates the brake mechanism, oil is forced under pressure into the vertical duct 48 and firmly presses the ball 51 against its seat. In this action it cooperates with the biasing action of the compression spring 52. At the same time oil flows through the duct 50 into the lower region 43 and the pressure of oil in this lower region 43 causes the diaphragm 46 to be pressed upwardly and, when there is no leak in the brake system attached to the outlet duct 55, the resulting contraction in the volume of the intermediate region 44 constituting a pressure chamber causes the diaphragm 45 also to be displaced upwardly against the biasing effect of the compression spring 54 with the consequent upward displacement of the upwardly extending rod 53 and the displacement of the ball 51 from off its seat. With the opening of this ball valve, oil can flow under pressure through the vertical ducts 48 and 47 and the duct 49 into the intermediate region 44 and through the outlet duct 55 to the brake mechanism.

Upon normal operation of the brake mechanism, the actuation of the mechanism by the driver results in this raising of the ball 51 from its seating and the flow of oil to the brake system. Should however a leak develop in the brake system to which the control valve is attached any actuation of the brake mechanism will not result in a compression of the oil in the intermediate region 44 and as a consequence the diaphragm 45 and the upwardly extending rod 53 will not rise so as to open the ball valve. Alternatively, if during the time the brake mechanism is actuated a leak develops in the brake system to which the control valve is attached, the pressure of the oil in the intermediate region 44 will decrease as a result of which the diaphragm 45 under the influence of its biasing spring 54 will be displaced downwardly with the consequent closing of the ball valve. In this way failure of one individual brake mechanism immediately results in the cessation of the flow of oil to that brake mechanism and as a consequence the oil from the central reservoir will not run to waste with consequent disastrous effect on the entire brake system of the vehicle.

It will be appreciated that the upwardly extending rod 53 of the embodiment just described may be replaced by a rod which is frictionally secured to a further rod secured to the diaphragm 45 in a manner similar to that described with reference to FIG. 1. By means of such a friction coupling it can be ensured that the ball valve closes immediately there is any drop in the pressure in the intermediate region 44 and not necessarily when the pressure drops to a predetermined low level.

I claim:

1. A hydraulic flow control device comprising a device inlet and a pressure chamber having walls, separated from the inlet by a pressure responsive member and provided with a device outlet, part of said walls of said pressure chamber being a resilient member adapted to be displaced under the influence of hydraulic pressure, a control valve designed to control communication between said inlet and said pressure chamber and being designed as to be biased into a closed position by the direct action of fluid flowing through the device inlet, communication between said pressure chamber and said control valve being by way of at least one channel formed in the pressure responsive member, a valve displacing means associated with the pressure chamber and arranged to be displaced so as to open the valve upon a rise of fluid pressure in the pressure chamber due to the displacement of the pressure responsive member under the influence of the fluid, the valve displacing means being associated with said resilient member so as to follow its displacement, and being coupled to said resilient member by means of a friction clutch, the arrangement being such that a minimal displacement of the valve displacing means results in an opening or closing of the valve.

2. A hydraulic flow control device comprising a device inlet and a pressure chamber having a resilient member, separated from the inlet by a pressure responsive member and provided with a device outlet, said pressure responsive member being flexibly mounted within a casing of the device so as to be displaceable under the influence of hydraulic pressure, a control valve designed to control communication between said inlet and said pressure chamber and being so designed as to be biased into a closed position by the direct action of fluid flowing through the device inlet, communication between said pressure chamber and said control valve being by way of at least one channel formed in the pressure responsive member, said valve being carried by the pressure responsive member, a valve displacing means associated with said pressure chamber and arranged to be displaced so as to open the valve upon a rise of fluid pressure in the pressure chamber due to the displacement of the pressure responsive member under the influence of the fluid.

3. A hydraulic flow control device according to claim 2, wherein the resilient member is constituted by a membrane to which is secured the pressure responsive member, the membrane being secured at its rim to the casing of the device.

4. A hydraulic flow control device comprising a device inlet and a pressure chamber having walls, separated from the inlet by a pressure responsive member and provided with a device outlet, part of said walls of said pressure chamber being a resilient member adapted to be displaced under the influence of hydraulic pressure, a control valve designed to control communication between said inlet and said pressure chamber and being designed so as to be biased into a closed position by the direct action of fluid flowing through the device inlet, communication between said pressure chamber and said control valve being by way of at least one channel formed in the pressure responsive member, a valve displacing means comprising a projecting rod secured to said resilient member so as to follow its movements, said means being displaced thereby lifting the valve off its seat so as to open the valve upon a rise of fluid pressure due to the displacement of the pressure responsive member in one direction under the influence of the fluid and said projecting rod being coupled to a further projecting rod by means of a friction clutch, means being provided for limiting the displacement of the further projecting rod under the influence of the first-mentioned projecting rod.

References Cited by the Examiner
UNITED STATES PATENTS

| 2,428,150 | 9/47 | Field | 137—100 |
|---|---|---|---|
| 2,478,211 | 8/49 | Sprague et al. | 137—498 XR |
| 2,484,177 | 10/49 | Mapes et al. | |
| 2,847,258 | 8/58 | Burdick | 303—84 |
| 2,965,730 | 12/60 | Regoli et al. | 60.54.5 XR |

ISADOR WEIL, *Primary Examiner.*
M. CARY NELSON, *Examiner.*